United States Patent

Brumlik

[15] 3,706,139
[45] Dec. 19, 1972

[54] CONSTRUCTION ELEMENTS FOR THE ASSEMBLY OF MOLECULAR MODELS, TOYS AND THE LIKE

[72] Inventor: George C. Brumlik, 154 Upper Mountain Avenue, Montclair, N.J. 07042

[22] Filed: Aug. 12, 1971

[21] Appl. No.: 171,180

[52] U.S. Cl.............................35/18 A, 85/85, 46/29
[51] Int. Cl...........................G09b 23/26, F16b 13/04
[58] Field of Search ...35/18 A; 46/28, 29, 26; 85/71, 85/80, 83, 84, 85; 287/20.92 B; 24/211 R, 211 L, 73 S

[56] References Cited

UNITED STATES PATENTS 1,559,619   11/1925   Karitzky...................................85/85
2,244,977    6/1941   Hansman.......................24/73 S UX
3,164,054    1/1965   Biesecker.............................85/84 X
3,341,903    9/1967   Buntic ..............................85/80 UX
3,509,642    5/1970   Brumlik..............................35/18 A

*Primary Examiner*—Harland S. Skogquist
*Attorney*—Edward F. Levy

[57] ABSTRACT

A coupling element for allowing a rod to be inserted and held in a hole in the thin wall of a spherical or other shape body and for maintaining proper alignment. The coupling element includes a plurality of outwardly biased segments with outwardly facing ridges and lips for securely gripping the thin wall. The inner surfaces of the segments include ridges for tightly gripping a rod inserted into the coupling element. The coupling element functions as a bore for the rod with proper alignment being maintained by the tight fit of the coupling element on the thin wall of the body.

10 Claims, 9 Drawing Figures

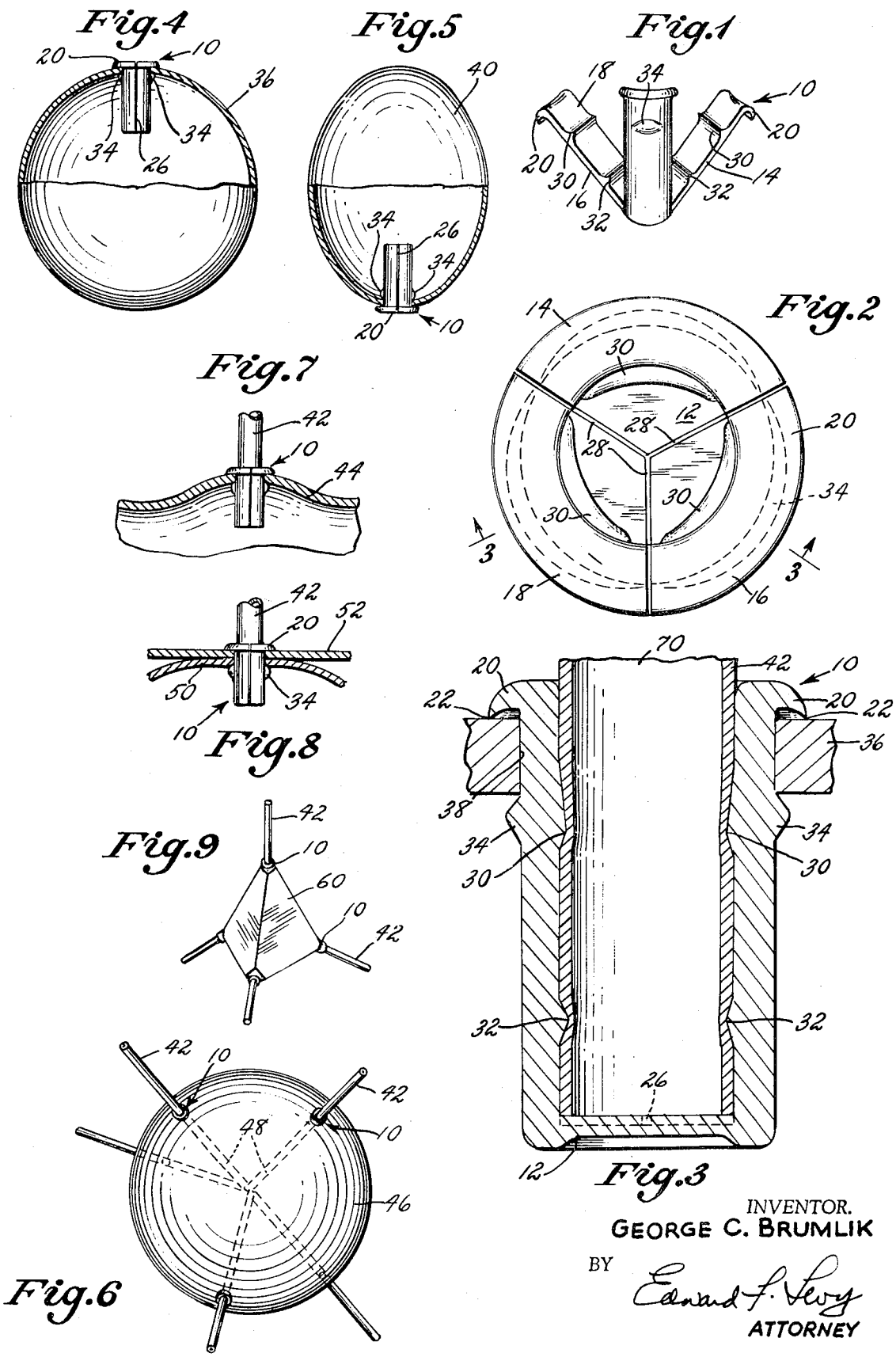

CONSTRUCTION ELEMENTS FOR THE ASSEMBLY OF MOLECULAR MODELS, TOYS AND THE LIKE

This invention relates to construction assemblies, and more particularly to construction elements for the assembly of molecular and crystallographic models, toys and the like.

There are many different types of construction sets which have been used to build molecular models. Such a set is typically provided with a number of bodies such as spheres, polyhedra and the like, which represent atoms, a number of rods or tubes for connecting the various bodies to each other, and a number of elements for securing an end of each rod to an atom body. For example, reference is made to my U.S. Pat. No. 3,080,662 dated Mar. 12, 1963 and entitled "Molecular Model Set."

In its simplest form, a molecular model set can consist of solid bodies each having cylindrical bores for insertion of respective rods. If the diameter of each bore is such that the end of a rod can be inserted into it with a tight fit, there may be no need for additional elements to connect a rod to a body.

Since atom bodies are generally quite large (for example, two inches in diameter), it is apparent that an entire molecular model set may be very costly and heavy if each of the bodies is solid. The set could be reduced in cost and made considerably lighter if each sphere or other atom body were made hollow with a thin wall having a number of holes cut out on the surface for insertion of rods. With thin-wall bodies, however, even where the diameter of each hole is small enough to tightly grip an inserted rod so that the rod cannot move in the axial direction, a problem is encountered which precludes the use of such a construction in most applications.

In the case of a sphere, the axis of each inserted rod should pass through the center of the sphere. This is especially true in the case of molecular model sets. Although a rod may be tightly gripped by the thin wall of a hollow sphere so that axial movement is not likely to take place, it is very difficult to maintain alignment of each inserted rod with a radius of the sphere. A construction set in which an inserted rod is not precluded from being misaligned cannot be used in many applications.

Although in the case of a sphere it is possible to speak of the alignment of an inserted rod to pass through the center of the sphere, this requirement can be generalized to apply to ellipsoids and surfaces of irregular shapes. The general requirement is that an inserted rod be perpendicular to the plane which is tangent to the surface of the body into which it is inserted at the point on the surface through which the axis of the rod passes. In the case of a sphere, of course, this is equivalent to stating that the axis of the rod is aligned with a radius of the body.

It is a general object of my invention to provide a construction set having a plurality of thin-wall body elements and a plurality of interconnecting rods in which the rod inserted into any body element is maintained perpendicular to the plane which is tangent to the surface of the body element at that point through which the axis of the rod passes.

Briefly, in accordance with the principles of my invention, I provide a plurality of coupling elements in the construction set. Each coupling element has a circularly-shaped base section and, in the illustrative embodiment of the invention, three upstanding segments which are normally biased outward from the base. When the three segments are pushed inward they form a cylindrically-shaped element.

On the outside of each of the segments, spaced slightly below the top of the segment, there is a ridge. At the top of the segment there is a rim which projects outwardly. The distance between the lower surface of the rim and the upper surface of the ridge on each segment is such that the two of them can tightly grip the wall of a body element between them. Consequently, when a coupling element is inserted into a hole in the body element, for example, a sphere, the ridge and rim on each of the three segments tightly grip the wall of the sphere. The coupling element can be pushed all the way into the sphere until only the thin rim is exterior of the surface of the sphere. The tight fit afforded by each of the three segments on the coupling element not only rigidly secures the coupler to the body, but also insures that the axis of the bore formed by the three segments is perpendicular to the plane which is tangent to the surface of the sphere at the point through which the axis passes.

At the top and bottom of the inner wall of each segment, another two ridges are provided, these ridges projecting inwardly. A rod which is inserted into the coupling element is tightly gripped by the three ridges at the top and three ridges at the bottom of the cylindrical bore formed by the coupler, and thus the rod is aligned with the axis of the bore. In this way, a rod can be rigidly held by the body element in the proper orientation despite the fact that the body element has only a thin wall. In essence, the coupler increases the length of the bore in the sphere. The ridge and the lip on the exterior surface of each segment maintain the "artifical" bore in the proper orientation relative to the surface of the body element so that an inserted rod will be properly aligned.

It is a feature of my invention to provide a coupling element for insertion into a hole of a thin-wall body, the coupling element having a plurality of segments biased outwardly from a base, each segment having projections for tightly gripping the thin wall of the body to align the axis of the bore formed by the segments perpendicularly to the plane which is tangent to the surface of the body at the point through which the bore axis passes.

It is a further feature of my invention to provide a plurality of projections on the inner surfaces of the segments so that they tightly grip an inserted rod such that the axis of the rod is aligned with the axis of the bore.

Further objects, features and advantages of my invention will become apparent upon consideration of the following detailed description in conjunction with the drawing, in which:

FIG. 1 is a perspective view of an illustrative coupling element;

FIG. 2 is a view of the coupling element as seen from above when its three segments are pushed inwardly to form a cylindrical bore;

FIG. 3 is a sectional view taken through the line 3—3 of FIG. 2 and shows how the coupling element is attached to the thin wall of a body and how a rod is held by the coupling element;

FIG. 4 is a partial sectional view of a coupling element inserted into a hole cut in the surface of a thin-wall spherical body;

FIG. 5 is a partial sectional view of a coupling element inserted into a hole cut in the surface of a thin-wall ellipsoid body;

FIG. 6 shows the manner in which five coupling elements and rods may be inserted into pre-formed holes cut in the surface of a thin-walled sphere to provide a trigonal bipyramid pattern;

FIG. 7 is a sectional view showing the attachment of a coupling element to the wall of an irregularly shaped body with a rod held by the coupling element;

FIG. 8 is a sectional view showing the manner in which the coupling element may be employed to attach the walls of two bodies together; and FIG. 9 is a perspective view of a polyhedral body having coupling elements inserted in the grooves thereof.

Referring in detail to the drawings, there is shown in FIGS. 1, 2 and 3 a coupling element 10 made in accordance with the invention and molded in unitary form of plastic material. The coupling element 10 includes a base section 12, in the form of a circular bottom wall, formed integrally with three upstanding sections 14, 16 and 18 which are biased outwardly to the position shown in FIG. 1 by the shape-retaining properties of the plastic employed as well as the structure of the base wall 12, as will be presently described. The segments 14, 16 and 18 are of arcuate transverse cross section, and when they are drawn together, the coupling element 10 is in the form of a hollow tube, as shown in FIG. 3, having a bottom end closed by the base section 12.

The upper end of each segment 14, 16 and 18 terminates in an external lip or rim 20 which projects laterally outwardly thereof. The lip 20 is downwardly curved, as shown in FIG. 3, and tapers to a narrow end edge 22. The end edge 22 of each lip 20 is arcuate, so that when segments 14, 16 and 18 are drawn together in the manner shown in FIG. 2, the lips 20 are drawn together, forming a circular upper flange with a continuous split end edge formed by the adjacent edges 22.

The elongated body of each segment 14, 16 and 18 are made of such width that when the lips 20 are drawn together into abutment, the segment bodies are separated by narrow longitudinal gaps 26. The base wall 12 is indented and made concave during molding, and is provided with three radial score lines 28 which divide the base into three 120° sections which are inclined outwardly and downwardly from the center of the base wall 12. Each of the score lines 28 is aligned with one of the respective gaps 26 between the segments 14, 16 and 18, the construction being such that the inclined 120° sections of base wall 12 serve as hinges which bias the segments outwardly to the position of FIG. 1 and permits the segments to be drawn together to the position of FIGS. 2 and 3.

Each segment also includes two internal transverse ridges 30 and 32, and an external transverse ridge 34. The external ridges 34 of the three segments 14, 16 and 18 cooperate with the lips 20 thereof to secure the coupling element 10 to the thin wall of a body into which a rod is to be inserted, while the six internal ridges tightly grip the rod inserted into the coupling element. Typically, the coupling element 10 can be made of such plastic as polyacetal, polyamide, polyester, or such metal as steel, aluminum, berylium-copper or the like. The length of the coupling element 10 is considerably greater than the thickness of the wall of the hollow object into which it is inserted, the length of the coupling element being preferably at least five times greater than the thickness of the wall.

FIGS. 3 and 4 show the coupling element 10 after it has been inserted through a circular hole in the wall of a hollow sphere 36 which may also be molded of plastic and may be made of two semi-spheres joined together. The hole 38 in sphere 36 is of a diameter only sightly larger than the internal diameter of the coupling elent 10. Consequently when the expanded coupling element is pushed into the hole 38, the three segments 14, 16 and 18 are forced inwardly so that the coupling element assumes its tubular cylindrical form.

The external transverse ridges 34 of each segment are spaced from the corresponding lips 20 by a distance sufficient to receive therebetween the wall of sphere 36. As the coupling element is pressed into the hole 38, the ridges 34 are depressed and pass through the hole 38. When the coupling element reaches its fully-inserted position, shown in FIG. 3, the ridges 34 snap below the sphere wall and the three segments 14, 16 and 18 spring outwardly and are biased firmly against the wall surface bordering hole 38. In this position the circular top flange formed by lips 20 bears against the outer surface of sphere 36, and the external ridges 34 bear against the inner surface.

It will be noted in FIG. 3 that because of the curvature of lips 20, the end edges 22 thereof are the only portions which engage the outer surface of the sphere 36. The distance between this lowest edge 22 of each lip and the top of the corresponding ridge 34 is slightly less than the thickness of the wall of sphere 36. This causes a compression of the lips 20, the latter functioning as springs to retain the sphere wall tightly gripped between the lips and the external ridges 34, and at the same time to insure that the outer edge of each lip makes full contact with the outer surface of the sphere. Because of the tight fit made by each of the three segments and the body wall, and because the lips are so curved that their combined end edges 22 form a composite circular edge which contacts the sphere body, the inserted coupling element forms a socket which extends radially within the sphere 36. In addition, since the circular edge of the combined lips is the only portion of the coupling element which engages the outer surface of the object in which the element is mounted, it will be appreciated that regardless of the diameter of the sphere, the coupling element will always automatically align itself to an inserted position in which it is radially disposed. Even in a non-spherical body such as an ellipse, the element will align itself to a position in which its axis is perpendicular to the plane which is tangent to the intersection of said axis and the outer surface of the object.

Because of the tight fit which can be achieved by the lips 20 bearing down on the outer wall surface, the coupling device 10 can be inserted and securely mounted within a hole of the proper diameter no matter what the shape of the body itself. FIG. 5 shows a coupling device 10 inserted into a hole cut through the surface of a thin-wall ellipsoid 40, while FIG. 7 shows the coupling element 10 (together with an inserted rod 42) mounted within the thin wall 44 of an irregularly shaped surface.

The coupling element 10 is intended for use as a socket for receiving and securely holding a rod 42. As shown in FIG. 3, this rod 42 is preferably hollow and tubular. The rod is preferably made of a stiff but deformable plastic, and is of a diameter to fit freely within the mouth of the coupling element 10. After the coupling element has been mounted in a sphere or other object, the rod is inserted into the element bore and is tightly gripped by the spaced ridges 30 and 32. As shown in FIG. 3, the plastic rod or tube 42 is actually crimped slightly by the internal ridges to insure a snug fit and lock the rod in inserted position. When inserted, the rod forces the segments outward so that a better grip of the coupling element 10 upon the object wall is obtained. Since the coupling element has automatically aligned itself in proper position, the inserted rod 42 will also be radially disposed with regard to the hollow sphere 36.

The use of a set of bodies, rods and coupling elements can be appreciated from an inspection of FIG. 6 which shows five coupling elements 10 and rods 42 contained in respective holes of a spherical body 46. The dotted lines 48 indicate that each of the rods 42 is held in alignment with a radius of the sphere in such a manner that all of the rods, if extended, would intersect at the center of the sphere.

While the coupling elements shown herein may have wide use in mounting rods accurately and securely on bodies of various types, and may be employed, for example, in providing quickly assembled construction kits and toys, they have particular utility in the field of molecular model assemblies of the type shown in my aforementioned U.S. Pat. No. 3,080,662. Such molecular models include spheres representing covalent core bodies of atoms connected by coupling rods to produce a molecular structure. For purposes of depicting the proper bond atoms rod-receiving sockets are set radially in the spheres and are arranged in various polyhedral patterns. It is essential, for proper molecular orientation, that the sockets be precisely radial.

In FIG. 6, the hollow spherical body 46 is formed with five bores each receiving a coupling element 10 in the manner previously described. The bores and the inserted elements 10 are arranged in a trigonal bipyramid pattern, so that when the rods 42 are inserted, they will extend radially in this geometric pattern. The sphere 46 and its inserted rods 42 may thus be used as an element of a precise molecular model. As described in my aforementioned U.S. Pat. No. 3,080,662, similar spherical bodies may be adapted to mount the coupling elements in tetrahedral, octahedral or other polyhedral patterns.

FIG. 8 shows an alternative assembly in which a coupling element 10 serves not only to properly align a rod 42, but also to secure two walls 50 and 52 to each other. The walls 50,52 may both be planar or wall 50 can be the wall of a sphere and wall 52 can be part of a plane surface. The lips 20 and the external ridges 34 tightly grip the two walls between them so that they serve a double function. In the coupling element 10, shown in FIG. 8, the distance between lips 20 and ridges 34 may be varied so as to accommodate therebetween the thickness of two adjacent walls. Alternatively, the coupling element 10 can be used in a double capacity with body walls of only half the thickness of wall 36 in FIG. 3.

FIG. 9 shows another alternative construction in which coupling elements 10 are mounted in a hollow body 60 formed in the shape of a polyhedron. Such bodies are disclosed in detail in my U.S. Pat. No. 3,509,642, and their use is described in depicting the shapes of covalent core bodies of bonding atoms in molecular models.

The body 60 shown in FIG. 9 is in the form of a tetrahedron, and its planar faces, terminating at finite corners, give an instant and graphic representation of the symmetry angles and planes of the particular atom when viewed within an assembled molecular model. To construct such molecular model, a plurality of the atom core bodies are interconnected by coupling rods which are mounted on the bodies in such a manner as to extend from each corner along respective axes which pass through the central point of the body, thus extending in directions representing the symmetry axes of the atomic and molecular orbitals.

Each of the corners of the hollow body 60 is made flat, and in each of the flattened corners circular openings are formed. In each of the openings a coupling element 10 may be inserted. Because of the self-aligning properties of the coupling elements, the central axis of each element will pass through the center point of the hollow body 60. When the tubular rods 42 are inserted in the coupling elements as previously described, and as shown in FIG. 9, the rods project symmetrically from the body 60 and each is directed toward the center point of said body. The rods 42 are employed to couple the body 60 to other polyhedral bodies constituting the molecular model.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. A coupling element for coupling a rod to a wall having a hole therein comprising a base section, a plurality of segments each attached at one end to said base section and biased outwardly away from said base section, each of said segments having an outwardly extending lip at the other end thereof and an outwardly extending ridge therebelow, with the distance between the lip and the ridge on each segment being such that they can accommodate said wall with a tight fit and mount said coupling element immovably on said wall with the axis of said element perpendicular to the tangent at the surface of said wall, and at least one inwardly projecting ridge on each of said segments for securely gripping a rod inserted between the segments when the coupling element is inserted into the hole of said wall with the outwardly extending lips and ridges gripping the wall therebetween.

2. A coupling element in accordance with claim 1 wherein the lower surface of each of said lips curves outwardly and downwardly from the attached segment toward said base section such that the only part of each lip which makes contact with the surface of said wall, when the coupling element is inserted into the hole of the wall, is the lower edge of the lip.

3. A coupling element in accordance with claim 2 wherein the distance in the direction of the axis of the coupling element between the lowest edge of the lip and the top of the outwardly extending ridge on the same segment is slightly less than the thickness of said wall so that when said coupling element is inserted into said hole said lips and said outwardly extending ridges are spread apart slightly further so that they bear against and tightly grip said wall.

4. A coupling element in accordance with claim 3 further including score lines on said base section, said score lines constituting spring hinges for biasing said segments outwardly away from said base section.

5. A coupling element in accordance with claim 3 wherein the inwardly projecting ridges extend an amount sufficiently to slightly crimp a rod inserted into the coupling element when it is contained within the hole of said wall, said segments being thereby pushed outwardly so that the lip and ridge on each of said segments tightly grip said wall.

6. A coupling element in accordance with claim 5 wherein each of said segments has two spaced ridges projecting inwardly from the inner surface thereof.

7. A model assembly comprising a plurality of thin-wall hollow body elements each having at least one hole in the wall thereof; a plurality of rods; and a plurality of coupling elements each for coupling a rod to a body element; each of said coupling elements having a base section, a plurality of segments each attached at one end to said base section and biased outwardly away from said base section, each of said segments having an outwardly extending lip at the other end thereof and an outwardly extending ridge therebelow, with the distance between the lip and the ridge on each segment being such that they can accommodate the wall of a body element with a tight fit when the coupling element is inserted into a hole in the wall, and means on the inner side of each of said segments for securely gripping a rod inserted between the segments when the coupling element is inserted into a hole in the wall with the outwardly extending lips and ridges gripping the wall therebetween.

8. A model assembly in accordance with claim 7 wherein said plurality of thin-wall hollow body elements include hollow spheres, the axis of each of said inserted rods passing through the center of said sphere.

9. A model assembly in accordance with claim 7 wherein said plurality of thin-wall hollow body elements include hollow ellipsoids.

10. A model assembly in accordance with claim 7 wherein said plurality of thin-wall hollow body elements include hollow polyhedra.

* * * * *